United States Patent [19]

Switzer et al.

[11] 3,898,566

[45] Aug. 5, 1975

[54] METHOD AND APPARATUS FOR REDUCING DISTORTION IN MULTICARRIER COMMUNICATION SYSTEMS

[75] Inventors: Israel Switzer, North York, Canada; Arie Zimmerman, Santa Monica, Lucius T. La Fleur, Torrance, Patrick A. Segrave, Santa Monica, all of Calif.

[73] Assignee: Phasecom Corporation, Hawthorne, Calif.

[22] Filed: Feb. 1, 1973

[21] Appl. No.: 328,888

Related U.S. Application Data

[63] Continuation-in-part of Ser. No. 293,796, Oct. 2, 1972, abandoned.

[52] U.S. Cl. ........... 325/308; 325/65; 178/DIG. 12; 178/DIG. 13; 179/15 FS

[51] Int. Cl. ............................................. H04b 3/50

[58] Field of Search.................. 178/DIG. 1, 13, 12; 179/15 FS, 15 FD; 325/52, 65, 308, 9, 10, 11; 324/83 A

[56] References Cited

UNITED STATES PATENTS

| | | | |
|---|---|---|---|
| 1,570,771 | 1/1926 | Nyquist | 179/15 FD X |
| 2,028,212 | 1/1936 | Heising | 179/15 FD X |
| 2,747,083 | 5/1956 | Guanella | 325/10 X |
| 3,358,231 | 12/1967 | Baganoff | 324/83 A |
| 3,619,782 | 11/1971 | Stokes | 325/308 X |
| 3,639,840 | 2/1972 | Shekel et al. | 325/308 |
| 3,665,316 | 5/1972 | Jeffers | 325/308 |
| 3,675,132 | 7/1972 | Hansen et al. | 325/11 |

*Primary Examiner*—Richard Murray
*Assistant Examiner*—Aristotelis M. Psitos
*Attorney, Agent, or Firm*—Donald C. Keaveney

[57] ABSTRACT

There is disclosed a method and apparatus for multiplexed transmission of a plurality of signals such as television programs through a communication system such as a coaxial cable containing one or more repeater amplifiers in a manner such as to reduce distortion below levels heretofore attainable. The system utilizes harmonically related coherent carriers ("HRC") all of which are generated from a master oscillator functioning as a system frequency synchronizer (and preferably having a frequency of 6 MHz) in order to make intermodulation frequencies in the system zero beat with the carriers to avoid the visual effects of picture degradation from such intermodulation or beat frequencies. The term "beat frequency" is herein used synonymously with "intermodulation frequency" to mean the frequencies of all intermodulation products including the harmonics. In addition to providing harmonically related coherent carriers, the relative phases of these carriers are adjusted in order to minimize or reduce their combined peak to peak amplitude. Reduction of peak amplitudes reduces excursions along the transfer curve for the amplifiers and permits operation on the linear portion of the amplifier and cable system instead of in the nonlinear range. In addition to avoiding the visual effects of beat frequencies, distortion products are also thereby actually reduced below values heretofore predicted or attained.

29 Claims, 9 Drawing Figures

METHOD AND APPARATUS FOR REDUCING DISTORTION IN MULTICARRIER COMMUNICATION SYSTEMS

CROSS REFERENCE TO RELATED APPLICATIONS

This application contains certain subject matter in common with and is a continuation-in-part of and improvement oven copending U.S. patent application Ser. No. 293,796 filed Oct. 2, 1972 and entitled "Coherent Harmonic Carrier CATV System" and now abandoned which is assigned to the same assignee as is this application. There is disclosed in that copending application a system for transmitting a plurality of television program signals over a transmission line such as the coaxial cable of a community antenna television system (hereinafter CATV) which minimizes the visual effects of triple beat and other second and third order distortion arising from repeater amplifier non-linearity by providing cable headend equipment including a system frequency synchronizer which generates a stable synchronizing signal of fixed frequency and applies this signal to a harmonic generator from the output of which all video carriers are derived. The synchronizing signal frequency may be 6 MHz which results in coherent harmonic video carriers each of which has a frequency which is an integral multiple of 6 MHz and all of which are spaced apart by at least 6 MHz which, of course, is the standard television channel width. In such a system the sum and difference beat frequencies of any order which result from any beat combination of the video carriers and which fall within one of the channels will zero beat with the video carrier of that channel. This zero beating with the carrier itself reduces the visual effects and picture degradation normally resulting from such beat frequencies. However, as was pointed out in the above noted application, second and third order products are not actually eliminated but merely have their subjective visual effect drastically reduced since the fact that they zero beat with the channel carrier means that the amplitude of the channel carrier will be increased or decreased slightly depending on the relative phase of the carrier and the intermodulation product. However, as was also pointed out therein, in such a basic system which does not include the additional improvements disclosed herein, crossmodulation will still remain and may indeed be effective increased by the intermodulation between modulation sidebands. The present invention is particularly directed to actually reducing not merely the visual effects of distortion, but the actual physical level of distortion and in particular the crossmodulation.

BACKGROUND OF THE INVENTION

The advantages of the system described in the above noted copending patent application using harmonically related coherent carriers for transmitting a plurality of multiplexed signals such as television programs in a multicarrier communications system were deemed to be sufficiently great to outweigh the possible disadvantage of a theoretically predicted increase in crossmodulation. Hence, such a system was built and tested and in the course of developing and testing the system it was discovered that in addition to the expected advantages thereof it was also possible by means of the method and additional apparatus disclosed herein to preserve all of the advantages thereof and additionally to actually significantly decrease the actual physical value of distortion products such as crossmodulation.

Both the original and the improved system use harmonically related coherent carriers so that the intermodulation and other distortion products fall directly on the carrier frequency rather than "near" the carrier as would be the case if the carriers were not harmonically related. Beat frequencies "near" the carrier are visable in the picture as though they were unwanted modulation in the picture. On the other hand a beat frequency "on" the carrier serves only to slightly alter the carrier amplitude, depending on the relative phase of the carrier and beat frequency.

It has now been found that a further benefit can be derived from the coherency and harmonic relationship of the carriers in such a system by controlling their phase relations to the fundamental. This benefit may be most readily understood if it is recalled that the analysis of a complex repetitive wave form (such as the sum of all the carrier signals on the cable) into its harmonic constituents can be carried out by means of Fourier analysis. Repetitive forms may thus be defined in terms of an infinite series of components by describing the amplitude and phase of the harmonic constituents. The inverse of Fourier analysis, that is, the synthesis of a repetitive wave form by addition of harmonically related components of controlled and known phase and amplitude is less well known, but it too has been studied for other unrelated purposes. Reference is made, for example, to the description of R. Pepinsky's work on Fourier synthesis at page 8–18 in the "Handbook of Physics" second edition, published by McGraw Hill and edited by Condon and Odishaw. His studies were reported in connection with the unrelated field of X-ray crystalography wherein it was desired to maximize waveform peaks to determine atomic properties, but certain of the digital and analog computing methods of Fourier synthesis used therein have relevance to the understanding of the present invention.

The HRC carriers described in the system of the copending patent application are added together for distribution in the cable system in the manner of a Fourier synthesis. Being coherent they add into a stable repetitive wave form whose exact shape depends on the relative amplitude and phase of the constituent carriers. The fundamental frequency of the wave form is the fundamental frequency from which the carriers have been derived, that is, the system synchronizing frequency, normally 6 MHz. Distortion in a broad band amplifier of the type used in such a system is reduced if peak excursions of the complex wave form being amplified can be reduced. It has been experimentally found that careful and prudent control of the relative phases of the constituent carriers controls the peak of the resultant wave form and thereby reduces crossmodulation. This was first experimentally observed by us by displaying the complex wave form in a 20 channel HRC carrier system on an oscilloscope while simultaneously measuring the crossmodulation by known techniques while sequentially inserting coaxial cable segments of varying lengths in two of the channels. The coaxial cable segments were acting as phaseshifters or delay lines. Such phase control does not affect the r.m.s. value of the composite wave form which will be the sum of the r.m.s. values of the individual component carriers, but the peak values of the composite wave form will depend on the phase relationships between the constituent carriers. It was such peak values which were observed on a high frequency oscilloscope capable of displaying the highest frequency components used in the 20 channel system under test. When the relative phases of the carriers were adjusted as noted, the composite wave form changed in peak value as expected and reduced distortion was observed in the amplifiers under test. The reduced distortion was observed as both reduction of intermodulation products and crossmodulation.

Optimum phase adjustment of all of the constituent carriers results in a composite wave form whose peak value is the lowest that is possible while still producing the sum of the r.m.s. values of the constituent carriers. The general analytical solution for predicting the optimum relationships between the carriers of a generalized number of "k" channels is not yet known to us, but the results of a computer analysis to determine the optimizing relationships for preferred practical embodiments of the system are given hereinafter.

The observed effect may also be thought of in term of an "addition law" for the loading effect of adding channels to a broad band system. The optimum situation is a "power law" addition which adds the power of individual component carriers with minimum increase of peak value. The extreme "worst case" for distortion in a system in which random uncontrolled phase relationships exist would be "voltage addition" in which the peak amplitudes of the constituent carriers all occur simultaneously and add to give the maximum peak amplitude. The most probable case in a random system is intermediate between this "worst case" and the optimum to which the control apparatus and method of the present invention is directed.

SUMMARY OF THE INVENTION

The present invention thus provides a method of reducing distortion such as crossmodulation between modulated carriers in a multicarrier communication system by establishing a coherent harmonic frequency relationship between the carriers, combining the carriers to transmit a signal which is their vector sum and which has a periodic wave form with a frequency equal to the fundamental frequency of the harmonically related coherent carriers, and adjusting the phase of at least one of the carriers with respect to the zero reference of the fundamental frequency periodic wave form by an amount which reduces the maximum peak-to-peak excursion of the transmitted signal waveform. The term "harmonically related coherent" as used herein with reference to a carrier frequency means a carrier having a frequency which is a harmonic physically derived from the fundamental signal itself and which, unlike a nominal or noncoherent harmonic, maintains the harmonic frequency relationship even with drift in the fundamental. It will be apparent to those skilled in the art that this method of using such HRC carriers has applicability to many communication systems other than the coaxial cable CATV system described in detail herein as a preferred application and that in either this preferred application or in any other application many different embodiments of apparatus for physically adjusting the phase as desired are available in addition to the specific preferred embodiment described below.

BRIEF DESCRIPTION OF THE DRAWINGS.

These and other features and advantages of the invention will be apparent to those skilled in the art from the following detailed description taken in connection with the accompanying drawings in which like reference characters refer to like parts throughout and wherein:

In FIG. 1*a* these components are added with zero phase difference to produce minimum peak-to-peak values. In FIG. 1*b* the third harmonic has a phase lead of $\pi$ radians of 180° and the components add to give maximum peak-to-peak value.

FIG. 2*a* illustrates the unmodified random phase condition. FIG. 2*b* illustrates the improvement achieved by moderate phase adjustment.

DETAILED DESCRIPTION OF A PREFERRED EMBODIMENT

Figure 1A:
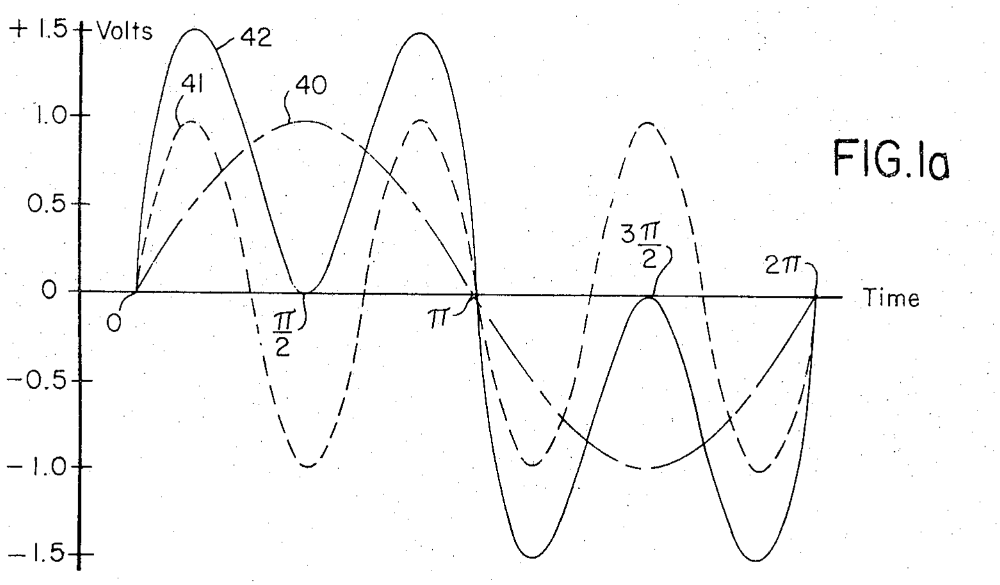
FIGS. 1*a* and 1*b* are simplified graphical illustrations of the Fourier synthesis of a wave form from the fundamental and the third harmonic.
Figure 1B:
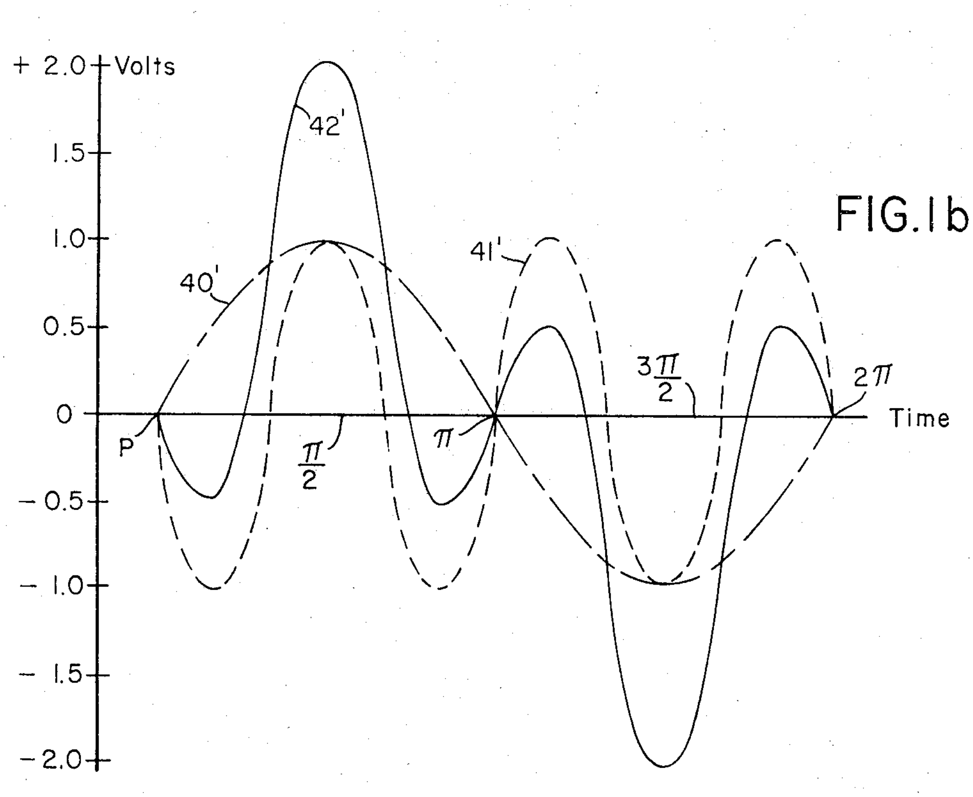

Turning now to the drawings there is illustrated in FIGS. 1*a* and 1*b* the superposition or addition of harmonically related coherent carriers and the fact that such superposition can be considered to be the inverse of Fourier analysis — that is, Fourier synthesis. It is known that any periodic function can be analyzed into a Fourier series — a series of sine, cosine, or sine and cosine terms of the fundamental and harmonics (depending upon the nature of the symmetry of the periodic function). The physical implication is that any periodic function can be analyzed by Fourier methods into a series of harmonics with definite phase and amplitude relationships. A periodic function defined only in terms of the amplitudes of its Fourier constituents is not uniquely defined. The phase relationships between the Fourier components must also be defined.

Similarly, waves which are harmonically related may be superposed into a periodic wave form which can thus be reproduced on an oscilloscope as a standing waveform. Here the term "superposed" is used to mean simultaneous existence in a linear system which in this case implies algebraic addition. The periodicity resulting from such superposition will be that of the fundamental. The exact nature of the resulting periodic function will depend on both the amplitude and the phases of the component waves.

The visual carriers of a cable television system may be considered to be a set of waves which are being added or superposed in a broad band distribution system. When these carriers are both harmonically related and coherent they may be considered to be components of a Fourier synthesis which will yield a composite waveform with a period which is that of the fundamental on which the carriers are based. The resulting function or complex waveform will have a unique form dependent on the relative amplitudes and phases of the component carriers. The r.m.s. value of the resulting function will depend only on the amplitudes of the component carriers and represents the addition of the power content of the component carriers. The peak amplitude of the resultant function, however, depends critically on the phase relationships between the component carriers. The peak amplitude reached by the periodic function can be substantially minimized by prudent selection of relative phases.

Carriers which are not coherent, that is not locked to a common physical source of signal at the fundamental frequency, will have random relative phases and will add in such a way that the sum waveform often reaches a peak which is the sum of the peak amplitudes of the component carriers. Carriers which are coherent initially have controlled inphase relationships. Unless phase control circuitry is provided, system processing may introduce individual random phase shifts, but such carriers can be phase controlled so that when and as applied to the cable their additive peak amplitude is substantially less than the sum of the individual peak amplitudes.

In particular, carriers which are harmonics of a common 6 MHz source will be coherent and will (as noted in the above copending application) have the advantage that the beat frequencies arising from second and third order (and all higher order) distortion products will also be harmonics and hence zero beat with the desired carriers. This significantly reduces their visibility on the television screen. If the ninth, 10th, 11th, 13th, 14th, and 29th through 35th harmonics of 6 MHz are used as the HRC carriers the resulting frequencies are sufficiently close to the F.C.C. assigned television broadcast carrier frequencies to permit tuned reception thereof by many standard television receivers.

Carriers which have nominal "normal" television carrier frequencies using the values assigned by the F.C.C. to commercial broadcast television can, however, also be made coherent by actually deriving each of them through suitable frequency multipliers from a common signal source of much lower fundamental frequency. For example, the conventional TV carrier frequencies: 55.25 MHz, 61.25 MHz, 67.25 MHz, 77.25 MHz, 83.25 MHz, 175.25 MHz, 181.25 MHz, etc. (to each of which must be added ± 0.01 MHz. as the F.C.C. 10 KHz "offset"), can be derived as actual physical harmonics of a common 10 KHz source. When they are so generated from a common source the nominal Channel 2 carrier at 55.25 MHz, for example, is the 5,525th harmonic of 10 KHz. The summation waveform of a coherent set of such carriers is also periodic but with a frequency of 10 KHz. The peak amplitude of this wave form is dependent on the phase relationships of the component carriers and can be reduced in value from the peaks experienced with noncoherent carriers of the same frequencies. Where the carriers used are, as preferred herein, harmonics or integral multiples of a common 6 MHz source, the summation waveform is agains periodic, but with a frequency of 6 MHz. The harmonics involved in such a 6 MHz system are of a much lower order and are hence far more easily analyzed and controlled in the manner desired than are the harmonics of a 10 KHz fundamental as will be clear from the discussion below.

Thus, the ninth harmonic of a 6 MHz fundamental or synchronizing signal has a frequency of 54 MHz which can often be received by the standard Channel 2 tuned circuits of commercial receivers nominally tuned to 55.25 MHz. The method of this invention is far more easily applied to a ninth harmonic of 6 MHz than to a 5,525th harmonic of 10 KHz. In either event, however, reduction of peak amplitudes reduces excursions along the transfer curve for the amplifiers of the system and thus reduces the actual value of distortion products generated in these amplifiers.

By way of illustration of the basic principle of superposition, FIG. 1*a* shows the results of adding a fundamental with its third harmonic with zero phase shift and FIG. 1*b* shows the addition or superposition of the same two waves, the fundamental and its third harmonic, with $\pi$radians phase shift of the third harmonic. It is assumed that both the fundamental and its third harmonic have unit or normalized equal amplitudes having a value of 1.0 on the relative scales shown. In practice the carriers of most systems are maintained at substantially equal amplitudes. In FIG. 1*a* both the fundamental wave 40 shown as a dashed line and its third harmonic 41, shown as a dotted line, cross the time axis together at 0 radians. The values assigned to points on the time axis are expressed in terms of radians of the fundamental wave 40. However, the zero point for the phase scale of any harmonic is herein defined to be the point on the superposed phase-time axes of the superposed harmonic and its fundamental at which the fundamental crosses the axis in the upward direction. A "zero phase relationship" is thus a phase relationship between the harmonic and its fundamental such that the upward zero crossing of both the fundamental and the particular harmonic occurs at the same point on their superposed time axes such as the point P in FIG. 1*a*. In this case the two waves are said to be "in phase" or to have a zero phase difference. Phase displacement of each harmonic is measured on its own time-phase scale. These harmonic time scales are related to the time scale of the fundamental by a factor equal to the order of the harmonic. Thus, a distance along the time-phase scale of the fundamental equal to $\pi$ radians is equal to a distance of $3\pi$ radians along the time-phase scale of the third harmonic. This may be seen from FIG. 1*a* wherein it will be noted that the third harmonic 41 has completed 1½ complete cycles or $3\pi$ radians during $\pi$ radians or one half cycle of the fundamental. Conversely, a phase shift along the time-phase scale of a harmonic will occupy only 1/nth of the time of a similar phase shift in the fundamental where $n$ is equal to the order of the harmonic. As used herein such a phase shift along the time-phase scale of the harmonic is measured from a zero point P on the common time-phase scale of the coherent harmonics at which the fundamental makes its upward or zero point crossing.

Shifting the phase of the third harmonic of FIG. 1*a* by $\pi$ radians on the third harmonic scale or, equivalently, $\pi/3$ radians on the fundamental scale, produces the result shown in FIG. 1*b*. Here the fundamental wave 40' and the third harmonic 41' add to produce the resultant 42' just as the fundamental and third harmonic added by superposition in FIG. 1*a* to produce the resultant wave 42. As noted above, the power transmitted in both cases is exactly the same. As can be seen, however, the peak values are quite different. In FIG. 1*a*, the sine of the third harmonic 41 reaches its maximum value of 1 when the third harmonic is at $\pi/2$ radians on its own scale or at $\pi/6$radians on the scale of the fundamental 40. The sine of $\pi/6$ which is, of course, the sine 30° has a value of 0.500. The sum is 1.500. The waves 40 and 41 intersect at $\pi/4$ on 40 for a combined value of 1.414. The maximum value of the peak of resultant wave 42 is thus 1.500 as shown.

In FIG. 1*b*, however, both the positive and negative peak of the third harmonic 41', occurs simultaneously with the corresponding peak of the fundamental 40', both occuring a $\pi/2$ and $3\pi/2$ respectively on the fundamental scale. This produces at each peak a "worst case" or totally reinforcing peak value of 2.0 for two components each normalized to a maximum value of 1.0. As a convenient simple illustration it is thus seen that in a two carrier system comprising the fundamental and its third harmonic, the phase relationship between the two components should be maintained so that they have zero phase difference as that term has been defined herein in order to achieve an optimum amplifier loading and transmission characteristic which minimizes distortion by minimizing peak value excursions. Since the wave forms of both FIG. 1*a* and FIG. 1*b* are symmetrical about $\pi$ radians, no consideration has yet been given to asymmetry as must be done in more complex cases. However, it will be noted that in FIG. 1*b* the peak-to-peak excursion has a total value of 4.0 whereas in FIG. 1*a* the peak-to-peak excursion has a value of 3.0. Control of the phase relationships between these two carriers can thus produce a reduction factor in the peak-to-peak excursion of 3.00/4.00 = 0.750 and a proportional reduction in distortion. Peak-to-peak amplitudes are considered because the amplifiers of the system are assumed to have a.c. coupling.

A similar result may be deduced from considering the component carriers as rotating vectors. The addition of a series of rotating vectors will depend on the differences between their angular velocities or frequencies. If these are randomly related for incoherent carriers, there will be frequent unpredictable coincidences of a "peaks in phase" condition of the type illustrated in FIG. 1*b* thus giving maximum peak amplitudes. If, on the other hand, the angular velocities are controlled and constant as in an HRC system, the resultant addition vector will be predictable and controllable as to peak amplitude by controlling the initial phases of the component carrier vectors. If the rotating vectors represent harmonics of the same fundamental, the angular velocity of each vector will be an integral multiple of the fundamental angular velocity. In such a system it has been found that experimental adjustment or equivalent empirical iterative digital computer analysis or analog computer analysis techniques can be used to determine the optimum desired initial phase conditions.

Figure 2A:
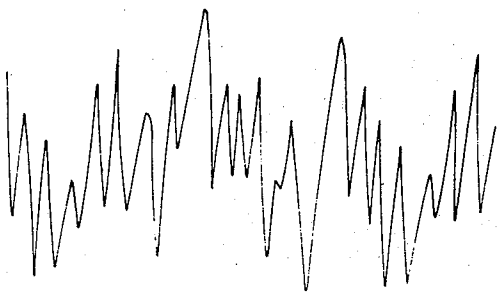
FIGS. 2*a* and 2*b* are reproduced oscilloscope pictures showing the actual wave form in the CATV system tested.
Figure 2B:
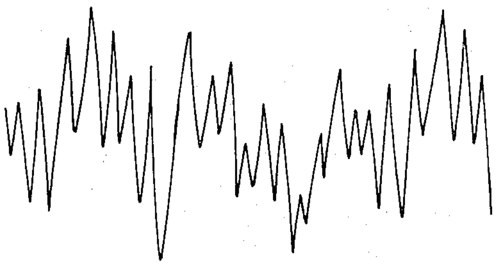

In FIGS. 2*a* and 2*b* respectively are shown waveforms reproduced from photographs of oscilloscope readings in early experimental efforts using segments of coaxial cable in two channels as phase shifters as noted above. The wave form of FIG. 2*a* was derived by adding a 6 MHz fundamental and its second through 20th harmonic in a 20 channel system using carriers which were coherent harmonics but which were in uncontrolled phase relationship to each other. Empirical adjustment of the phase of two carriers modified the wave form to that shown in FIG. 2*b*. The peak-to-peak excursion was reduced in a measured ratio of approximately 13/15 which was a reduction but not an optimum.

A digital computer analysis using iterative programming techniques to determine the optimum phasing of equi-amplitude, harmonically related coherent carriers to achieve minimum peak-to-peak excursions for their sum in a practical 13 channel system and a practical 25 channel system has given the results set forth below.

For a 13-channel system using the following harmonics of 6 MHz: 9, 10, 11, 13, 14, 25, 29 through 35 the optimum phases are:

11th harmonic, −1.630 radians
13th harmonic, −1.709 radians
14th harmonic, −1.402 radians
25th harmonic, −1.492 radians
31st harmonic, −1.562 radians
32d harmonic, −1.408 radians
33d harmonic, +1.554 radians
34th harmonic, −1.418 radians
35th harmonic, +1.884 radians Those not listed are equal to zero. If the harmonics have unit amplitude, thier sum could be anywhere in the range (−13, +13). With the phases listed above, the peak negative value is −6.32 and the peak positive value is 5.39, for a peak-to-peak value of 11.71. The reduction factor is 11.71/26 = 0.450 in this case. Note that the sum waveform is not symmetric so that a slight biasing, (6.32–5.39)/2 = 0.46, is required if the amplifier characteristic is symmetrical. In practice the 25th harmonic is used as a secure pay T.V. channel for which a set-top converter is required.

For a 25-channel system using the following harmonics of 6 MHz: 9, 10, 11, 13, 14, 20 through 39 the optimum phases are:

20th harmonic, −1.382 radians
21st harmonic, −1.451 radians
22d harmonic, −1.520 radians
23d harmonic, −1.444 radians
24th harmonic, −1.507 radians
26th harmonic, −1.588 radians
27th harmonic, −1.526 radians
28th harmonic, −1.582 radians
30th harmonic, +1.444 radians
33d harmonic, +1.597 radians
36th harmonic, +1.584 radians
37th harmonic, +3.014 radians
38th harmonic, +2.791 radians
39th harmonic, +1.224 radians Again those not listed are equal to zero. If the harmonics have unit amplitude, the peak values of the sum using the phases above are −11.90 and +9.73 for a peak-to-peak excursion of 21.63. The reduction factor in this case is 21.63/50 = 0.432 and the asymmetry biasing is (11.90–9.73)/2 = 1.08.

The results stated above were obtained by an iteration procedure in a digital computer simulation which is quite efficient and are believed to be a very close approximation to the analytically true optimum values. The theoretical solution for this analytical minimization in the general case of a "k" channel system is not known to us. Making adjustments of the type indicated above have, however, been experimentally observed to produce the predicted reduction in peak-to-peak values and a resultant reduction in crossmodulation.

Although the theoretical analytical expression for a minimum is not yet known to us the following observations have been made. In a five carrier system it is not possible to achieve as great a peak-amplitude reduction as for systems with many more carriers. Using unit amplitudes and harmonics 1 through 5 the optimum phases are:

1st harmonic, +90.36°

2d harmonic, 0°
3d harmonic, −97.20°
4th harmonic, −97.93°
5th harmonic, 0°

The peak excursions of the sum are +2.68 and −2.87 for a peak-to-peak value of 5.55; the peak-to-peak reduction factor is 5.55/10 = 0.555. The above noted reduction factor for the 1st and 3rd was 0.75 whereas for the 13 channel system it was 0.450 and for the 25 channel system it was 0.432. Apparently one can't do well when there are only a few harmonics. Although the method is more advantageous for a larger number of harmonics, other factors are also involved.

For example, a 20 carrier system comprising the fundamental or first harmonic and the 2nd through 20th harmonics was spectacular in comparison, giving a better reduction than even the 25 carrier system discussed above. It appears desirable not to have missing components. Again unit amplitudes were used for harmonics 1 through 20. The optimum phases are:

10th harmonic, −72.02°
11th harmonic, −71.28°
12th harmonic, +86.4°
13th harmonic, +84.23°
14th harmonic, +90.71°
15th harmonic, −97.20°
16th harmonic, −92.13°
17th harmonic, +97.88°
19th harmonic, +72.04°
20th harmonic, −86.45°

The 1st through 9th and the 18th harmonics have zero phase. The peak excursions of the sum are +6.60 and −7.35 for a peak-to-peak value of 13.95; the peak-to-peak reduction factor is 13.95/40 = 0.349. This value is substantially only one third of the possible worst case value.

Figure 3:
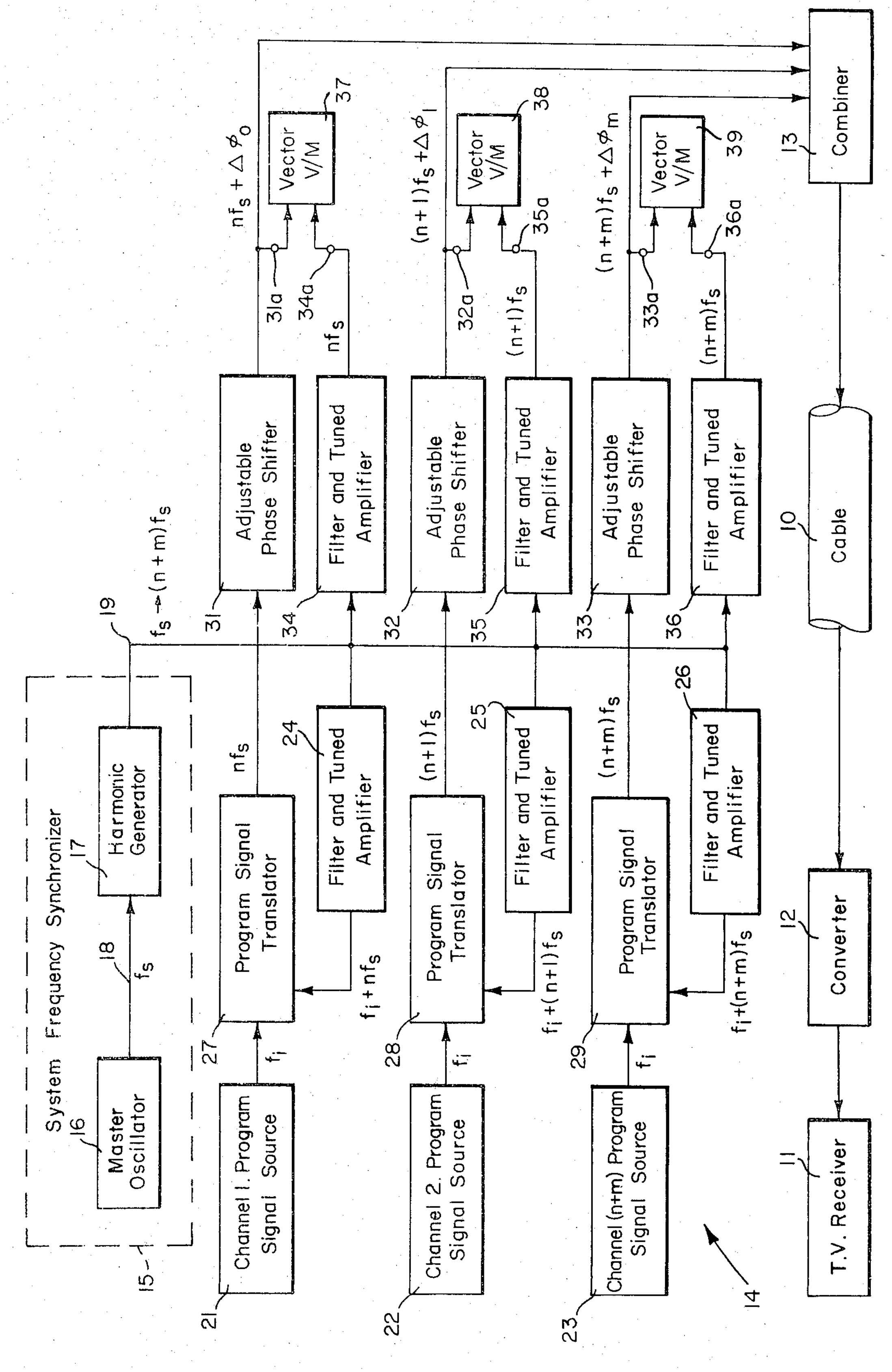
FIG. 3 is a block diagram of headend equipment embodying apparatus for carrying out the method of the present invention.

Head-end equipment of the type described in the above noted copending application and further including circuitry for carrying out the method of phase adjustment described herein is hown in FIG. 3. Such equipment is intended for supplying a plurality of television programs for transmission over a cable 10 to one or more standard television receivers 11 which may, if necessary, include a set top or other converter 12 for changing the HRC frequencies to standard broadcast carrier frequencies. The fidelity of the program signal which can be transmitted over cable 10 to the receiver 11 depends upon the transmission characteristics of the cable 10 and the transfer characteristics of the repeater amplifiers (not shown) which are necessarily included in a cable transmission system of any significant length. These characteristics in turn depend upon both the frequency and phase relationships of the video carrier signals supplied to the cable 10 from the combiner 13 which is the conventional output stage of the headend equipment which either originates its own program source material or receives commercially broadcast television programs and supplies them to the cable after processing to produce the appropriate electrical characteristics.

The headend equipment of the present invention which is indicated generally in FIG. 3 by the arrow 14 includes a system frequency synchronizer 15 which may comprise a master oscillator 16 the output of which is supplied to a harmonic generator or "comb" 17 over conductor 18. The master oscillator 16 is preferably a crystal controlled oscillator having an output signal of fixed frequency, $f_s$. The output of the harmonic generator 17 which is supplied to bus conductor 19 for distribution to each of the channels of the headend equipment is thus a composite signal having as its components both the fundamental frequency, $f_s$ and an integral number $(n + m)$ of harmonics thereof. For example, in one preferred embodiment the oscillator 16 has an output with a frequency of 6 MHz and the output of the harmonic generator 17 includes components at 6 MHz and at frequencies which are integral multiples or harmonics of the 6 MHz fundamental. These harmonics include 12, 18, 24, 30, 36, 42, 48, 54 MHz and so on. The number of useful harmonics to be generated in any given system depends on the number $(n + m)$ of the order of the highest harmonic to be used. The order, $n$, of the lowest harmonic to be used may be either one as in the case where the fundamental and the 2d through 20th harmonics are used or 9 as in a typical system where the 9th harmonic of 6 MHz at 54 MHz is used in place of the standard channel 2 frequency of 54.25 MHz, or any other desired integer. Furthermore, a given system may use all or any preselected portion of the total number $(n + m)$ of harmonics on the conductor bus 19. In the illustrative block diagram of FIG. 3 only 3 channels are shown, that is, a channel 1 program signal source 21, a channel 2 program source 22, and a channel $(n + m)$ program signal source 23. It will of course be understood that the breaklines in conductor 19 and the indication of program source 23 as channel "$n + m$" is intended to indicate that any desired number of channels may be used in repetitive fashion.

Each of these channels is provided with a filter and tuned amplifier circuit as at 24, 25, and 26, to which the composite signal on line 19 is applied as an input and which selects from this input the appropriate frequency for the particular channel involved. Thus, channel 1 is provided with circuit 24, channel 2 is provided with circuit 25, and channel $(n + m)$ is provided with circuit 26 all of which are connected to conductor 19.

As noted above the program signal source circuits 21, 22, and 23 may in practice be either a modulator circuit which serves to impress a locally produced television program on to a video carrier of intermediate frequency, $f_i$, or, alternatively, one or more of the circuits may be a heterodyne processor which receives a commercially broadcast television program and supplies it through a down converter mixer to an i.f. processor. In either event the output of each of the program signal source circuits will be a program modulated carrier signal at a preselected fixed intermediate frequency, $f_i$, which in the exemplary circuit shown in greater detail in the above noted copending application has a value of 48 MHz. It will be seen from the discussion of FIGS. 5, 6 and 7 below that either this harmonically related intermediate frequency or a more conventionally used intermediate frequency having a value such as 45.75 MHz may be used consistently with the principles of this invention; that is, the locking of the carrier frequency to coherence with $f_s$ does not depend on the intermediate frequency used. Referring to the circuitry shown in FIG. 3, however, a possible embodiment will be discussed which uses an intermediate frequency which is a harmonic of the system synchronizing frequency, $f_s$. The modulated intermediate frequency carrier which is the output of the program signal source in each channel is then supplied to a program signal frequency translator circuit. Thus, in FIG.

3 it will be noted that in channel 1 the output of signal source 21 is applied as an input to translator circuit 27. Analogous signal frequency translator circuits 28 and 29 are similarly provided in channel 2 and in channel $(n + m)$ respectively. The program signal frequency translator has the function usually ascribed to the circuit commonly referred to as an "up converter" and may, for example, be a conventional double balanced heterodyne mixing circuit as is discussed in greater detail in the above noted copending application. In systems where lower order harmonics are used, the lower channels may actually be lower in frequency than the selected value of the intermediate frequency. The name "up converter" in such instances is thus inappropriate and the more general term "program signal translator" or, synonymously, "signal frequency translator" is preferred. As indicated in FIG. 3, each of the program signal translators is supplied with an appropriate signal from conductor bus 19 via the filter and tuned amplifier circuits 24, 25, and 26 to establish and maintain the frequency relationships between the channel outputs as a harmonically related coherent frequency relationship.

Whatever the precise circuit details of the program signal translator circuit selected, it is assumed that its output will in each channel include a selected component which is equal in frequency to the difference between its two input frequencies. Since one of the inputs to each of the translator circuits is at predetermined fixed intermediate frequency, $f_i$ (which is here assumed to be 48 MHz) the other input must in each case exceed this value by an amount equal to the desired carrier frequency for that channel. That is, it is desired that the video carrier transmitted over the cable for channel 1 program be equal in frequency to $nf_s$, then the input selected from conductor bus 19 as the input to the translator circuit 27 must be equal to $(f_i + nf_s)$ in order that the difference between this value and the other input, $f_i$, shall in fact be equal to $nf_s$. Similar reasoning applies to the value shown in FIG. 3 for the other channels. In FIG. 3 where we have assumed an exemplary value of the frequency $f_s$ to be equal to 6 MHz and an illustrative intermediate frequency value $f_i$ equal to 48 MHz, if it is desired that the channel 1 carrier have a value of 54 MHz to approximate the commercially broadcast channel 2 carrier at 55.25 MHz, then $n$ would have a value of 9 since 54 MHz is the 9th harmonic of 6 MHz and the filter and tuned amplifier 24 would be tuned to 102 MHz so that the output of the heterodyne mixer in signal translator 27 would include the difference frequency between the two inputs at the desired 54 MHz value. Analogous reasoning applies to all other channels.

The features of the system of FIG. 3 described above are those features which were described in greater detail in the copending patent application and are sufficient to establish and maintain the harmonically related coherent relationship between the carriers which is desired in order to eliminate the visible effects of beat frequencies by causing them to fall on the carrier for any given channel. As noted above, it is also desirable to minimize the actual physical distortion by minimizing the peak-to-peak excursion of the vector sum of the carrier frequencies which is the output of combiner 13 which is applied to cable 10. Circuitry for implementing the method described above for achieving this end is also shown in the system of FIG. 3. Thus, there is provided between the combiner 13 and the program signal translator of each channel an adjustable phase shifter such as the circuits 31, 32, and 33 in channels 1, 2, and $(n + m)$ of FIG. 3 respectively. This phase shifter may be any conventional circuit for adjustably controlling the phase of the carrier signal passing through it over a range of + or − 180°. One specific example of a suitable circuit is given in the circuit diagram of FIG. 4.

Figure 4:
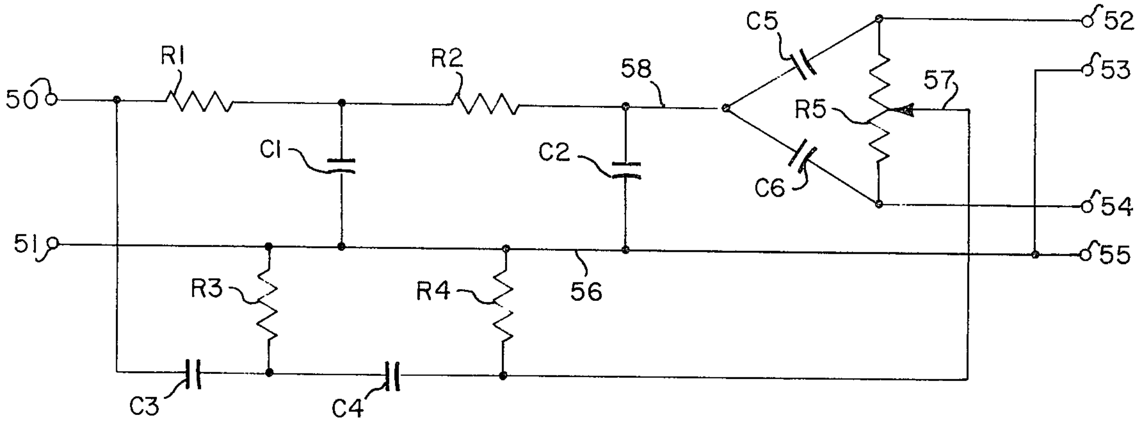
FIG. 4 is a schematic circuit diagram of one phase shifter circuit suitable for use in the system of FIG. 3.

These phase shifter circuits are adjusted to produce phase shifts having the values given above for exemplary systems, or values experimentally determined for any given system, in order to minimize the peak-to-peak excursions of the composite vector signal on the cable 10. It will be recalled, however, that these phase shifts were specified to be with respect to a zero phase reference at the fundamental or system frequency synchronizing value, $f_s$. The output of master oscillator 16 after passing through harmonic generator 17 is of course such a desired zero phase reference on conductor bus 19. However, the processing circuits included in the amplifiers 24, 25, 26 and the signal translators 27, 28 and 29 together with filtering and coupling circuits of a conventional nature used in headend equipment will inherently introduce the accidental or random phase shifts implicit in the circuit components. Thus, the outputs of translator circuits 27, 28 and 29 are harmonically related coherent frequencies of random phase distribution. In order to obtain a zero phase reference for comparison and adjustment of these frequencies there is provided for each channel a filter and tuned amplifier circuit tuned to the desired carrier frequency for that channel and connected directly to the conductor bus 19. Thus the filter and tuned amplifier 34 is so connected in channel 1 and is tuned to the channel 1 carrier frequency, $nf_s$, which is here assumed to have a value of 54 MHz. Similar circuits 35 and 36 are provided in channel 2 and channel $(n + m)$ respectively. The outputs of these tuned amplifier zero reference circuits are applied to output terminals or test points 34*a*, 35*a*, and 36*a* in each of the three channels respectively. A second output terminal or test point is provided in each channel and is connected to the output of the adjustable phase shifter for that channel. Thus, phase shifter 31 is connected to test point 31*a*, phase shifter 32 is connected to test point 32*a* and phase shifter 33 is connected to test point 33*a*. The phase shift, if any, in the transfer characteristic of the amplifiers 34, 35, and 36 may readily be measured and the values of desired phase shift given above with respect to a zero reference may thus be appropriately adjusted. These values so adjusted are used in making the adjustment of the phase shifter circuits by applying a vector voltmeter or any other manual or automatic phase measuring device between the two test points in each channel. In FIG. 3 a separate vector voltmeter is shown for each channel, as at 37, 38, and 39, but it will of course be understood that in practice a single portable measuring instrument such as a vector voltmeter would be used in making the initial adjustment for each channel and in performing any necessary maintenance checks. The headend front panel potentiometer 57 which is included in the phase shifter circuit as shown in FIG. 4 is adjusted until the vector voltmeter shows a phase difference between the output going into the combiner for that channel and the zero reference fundamental frequency zero point as defined above which phase difference has a value equal to that specified above for the particular system in order to carry out the method and achieve the results described above.

The phase shifter circuit may be any conventional circuit capable of achieving the desired phase shifts. The particular circuit shown by way of illustration in FIG. 4 is adapted from a circuit shown on page 466 of the "Source Book of Electronic Circuits" by John Markus, published by McGraw Hill in 1968. The circuit has a pair of input terminals 50 and 51 and two pair of output terminals for the phase shifted outputs. The first pair of output terminals 52, 53 takes signal between common conductor 56 which is connected to terminal 53 and the top of a potentiometer 57, a second pair of output terminals 54, 55, takes signal between the common conductor 56 to which terminal 55 is connected and the bottom of the potentiometer 57. The wiper arm of the potentiometer 57 is connected through capacitors C3 and C4 to the input terminal 50. The control knob for the wiper arm of potentiometer 57 is, as noted above, mounted on the front panel of the headend equipment. The top end of potentiometer 57 is connected through capacitor C5 to a conductor 58 which leads through resistors R2 and R1 to terminal 50. The bottom end of potentiometer 57 which has a total resistance R5 is connected through capacitor C6 to the conductor 58. A capacitor C1 is connected between the junction of resistors R1 and R2 and the common conductor 57. A capacitor C2 is connected between the other end of resistor R2 and common conductor 56. A resistor R3 is connected between the junction point of capacitors C3 and C4 and the common conductor 57. A resistor R4 is connected between the other side of capacitor C4 and common conductor 57. The phase shifting circuit has component values determined by the frequency of the carrier for the channel in which it is located. Illustrative values of the components of this circuit as used for channel 1 in FIG. 3 which is assumed to have a value of 54 MHz for the carrier frequency are as follows: R1, R3, and R4 each 75 ohms; R5, 1000 ohms; C1, C2, C3, and C4 each 40 pico-farads; and C5 and C6 each 0.001 farads.

Figure 5:
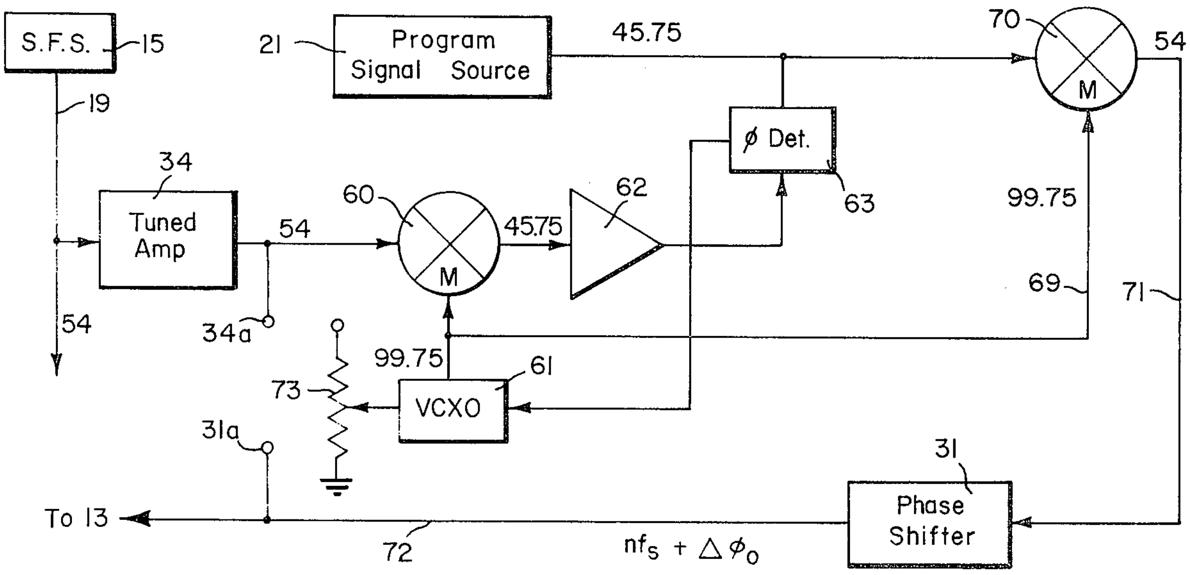
FIG. 5 is a block diagram of a modified circuit suitable for use in any single channel of the system of FIG. 3.

In FIG. 5 there is shown a modification of the circuitry which may be used in each of the channels shown in FIG. 3. In FIG. 3 both the tuned amplifier 24 tuned to a frequency of $f_i + nf_s$ and the tuned amplifier 34 tuned to a frequency $nf_s$ are shown for the sake of clarity of illustration and consistency with the disclosure in the above noted copending application. In practice, however, the functions of both of these amplifiers can be accomplished with a single tuned amplifier in the manner shown in FIG. 5. In FIG. 5 circuitry for the channel 1 processing is shown by way of illustration. It will be noted that the conductor bus 19 is connected to the input of tuned amplifier circuit 34 which is tuned to the carrier frequency, $nf_s$, here assumed to be 54 MHz. The output of this amplifier is applied not only to test point 34*a* as in FIG. 3, but also to a heterodyne mixer circuit 60 the other input to which is the output of a voltage controlled crystal oscillator 61 serving as its local oscillator. This oscillator 61 is tuned, for example, to a frequency of 99.75 MHz (more generally to $f_i + nf_s$) so that the difference output of mixer 60 will be at 45.75 MHz ($f_i$) which is the above referred to conventional intermediate frequency which may, if desired, be used in this modification. The output of mixer 60 is applied to an i.f. amplifier 62 the output of which is in turn applied as one input to a phase detector 63 which is the control element in a phaselock loop by which a received television broadcast signal will be phaselocked and thus made coherent with the implicit i.f. signal derived through mixer 60 from the system frequency synchronizer signal on conductor bus 19, as explained below.

The other input to phase detector 63 is the output of program signal source 21 which may be a local modulator output or which may be the output of a heterodyne mixer such as a conventional downconverter mixer. Thus, a television broadcast signal in conventional channel 2 which may have been received at a conventional broadcast carrier frequency of 55.25 MHz may be down converted to the 45.75 MHz i.f. and be supplied through an i.f. amplifier as the output of program signal source 21. This output is, of course, not coherent with the corresponding outputs in any of the other channels which may be other received broadcast signals or which may be locally generated programs. Neither is this output signal coherent with the system frequency synchronizer. Typically, received broadcast signals will have considerable drift which must be corrected in order to achieve the desired coherence.

Such coherence is achieved by feeding the upconverter mixer 70 through the phaselocked loop consisting of phase detector 63 and the associated circuitry described above. When the received signal starts to drift, detector 63 will produce on conductor 68 a d.c. output voltage which is a measure of the phase difference detected and which is applied to the voltage control crystal oscillator 61. This control signal causes a corresponding shift or drift in the frequency or equivalent phase of oscillator 61. The output of this oscillator is applied not only to mixer 60 but also over conductor 69 as the local oscillator input to the up convertor heterodyne mixer 70. The oscillator 61 will be changed in frequency by the control signal on line 68 until the detector 63 sees a zero phase difference. Oscillator 61 is thus caused to be slaved to any drift in the received signal by virtue of the fact that mixer 60 the output of which is applied as the other input to phase detector 63 is receiving its other inut from a known fixed frequency source via amplifier 34 and conductor bus 19. The frequency drift of oscillator 61 will thus be caused to be exactly parallel to and to compensate for the frequency drift in the received signal when subtracted from it at the upconverter mixer 70 leaving only a difference signal equal in frequency to $nf_s$, the selected output from conductor 19, here shown as 54 MHz. That is to say, the output of oscillator 61 is applied over line 69 as one input to upconverter mixer 70 whereas the i.f. processed received signal is applied as the other input thereto. The frequency drift of these inputs being the same will cancel each other out in the difference signal output at 54 MHz which is on conductor 71 and which is applied as an input to the phase shifter 31. Thus, the output on conductor 71 will be at the channel 1 carrier frequency of 54 MHz and will be phaselocked to the stable system frequency synchronizer oscillator so that this signal is not only harmonically related to but also coherent with that synchronizer signal.

The desired phase shift in order to minimize peak-to-peak excursion in the cable signal is then introduced by the phase shifter 31 in the same manner as has been discussed above by applying a vector voltmeter between test points 31*a* and 34*a*. However, since the tuned amplifier 34 as shown in FIG. 5 is tuned to the actual channel carrier frequency (here 54 MHz) only one such tuned amplifier circuit is needed per channel. The same phaselock circuit can be used when the program signal source 21 is a modulator circuit for transmitting a locally generated program rather than a heterodyne processor for transmitting a commercially broadcast program. The output of phase shifter 31 is of course applied from either type of processor over conductor 72 to a combiner circuit such as the combiner 13 in FIG. 3.

It will be noted that in the modification of FIG. 5, the intermediate frequency signal is indirectly or implicitly derived from the conductor bus harmonics through the phaselocked loop including mixer 60, amplifier 62, and detector 63 rather than being directly derived from the conductor through a tuned amplifier such as the amplifier 24 in FIG. 3. As will be seen from the copending application, however, such a phaselock circuit may be used in practice in any event and the combined function results in an economy of manufacture. The potentiometer 73 which is supplied from a source of fixed D.C. potential and which has its wiper arm connected to the voltage controlled crystal oscillator 61 is adjustable from the front panel of the headend equipment and is used to adjust the operating point of the phaselock loop to lie at the midpoint of its "S" characteristic to assure maximum effectiveness of the phaselock action. This potentiometer, however, is not the adjustment potentiometer of the phase shifter circuit 31 shown in FIG. 4. Both adjustment potentiometers are frontpanel mounted and serve separate functions. It will also be understood that in practice the processor circuity of FIG. 5 includes parallel processing of the audio subcarrier in the manner illustrated in the copending application.

Figure 6:
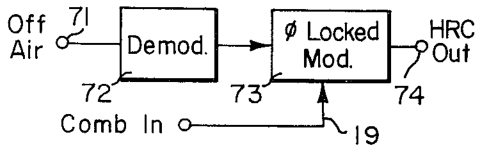
FIGS. 6 and 7 and respectively second and third modifications of such a single channel circuit.
Figure 7:
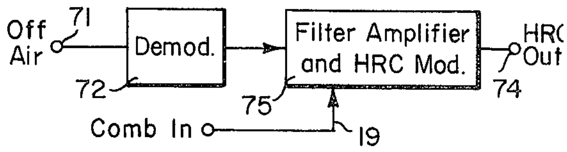

It should also be noted that the heterodyne down converter technique assumed by the program signal source 21 of FIG. 5 is not the only manner in which the present invention can be applied to retransmission of received broadcast signals. FIGS. 6 and 7 illustrate two possible alernative circuits.

In FIG. 6 a received or "off air" signal is applied via terminal 71 to a demodulator or detector 72 the output of which is used to modulate a phaselocked modulator 73 the output of which will then be modulated HRC carrier. Block 73 may, for example, be the circuit of FIG. 5 wherein program signal source 21 is simply a modulator connected to receive the output of demodulator 72 thus eliminating the heterodyne downconverter. Output from the comb is applied from bus 19 to circuit 73 as in FIG. 5.

Finally, as shown in FIG. 7, even the phaselock circuitry can be omitted if an i.f. modulator operating at a system harmonic frequency is used or if an "on channel" modulator is used. In FIG. 7 an "off air" signal is applied via terminal 71 to demodulator 72 as in FIG. 6. Circuit 73, however, is here replaced by a filter-amplifier driven HRC modulator 75. Output from a tuned amplifier such as 34 of FIG. 5 may in this FIG. 7 configuration be applied directly to drive a modulator running at the related HRC frequency which receives the output of "off air" demodulator 72 (or a locally generated "on channel" program) as its input. The output of circuit 75 will then be the desired modulated harmonically related coherent carrier. In both FIG. 6 and FIG. 7 the output from terminal 74 is applied through a phase shifter circuit of the type shown at 31 in FIG. 5 and in detail in FIG. 4 to the system combiner 13 in order to achieve the desired transmission characteristiscs described above. The improvement in those characteristics have been specified on the assumption that the system will use a-c amplifiers. Hence the "worst case" for a 1 volt signal in each channel was assumed to be two volts peak-to-peak times the number of harmonic carriers used in a given system even though there are many harmonic combinations (such as the first and second) where both the positive and negative peaks can never both coincide as they can for the first and third. Nonetheless, either all positive peaks or all negative peaks can always all coincide for the worst case phase relationship. Since the amplifiers are a-c the full peak-to-peak excursion must be taken into account.

What we claim is:

1. The method of reducing distortion in a multicarrier CATV cable communication system comprising the steps of:

a. establishing a harmonically related coherent frequency relationship between the carriers of said system, said coherent harmonic frequency relationship being established by physically deriving each of said carriers from a fixed frequency fundamental signal to maintain the harmonic frequency relationship even with drift in the fundamental so that the sum and difference beat frequencies of any order which result from any beat combination of said video carriers in said combined transmitted signal will zero beat with one of the video carriers thereof;

b. deriving each of said carriers as a different harmonic of said fundamental signal without regard to whether said harmonic is of odd or even order to provide a plurality of carriers including at least one odd harmonic and at least one even harmonic of said fundamental signal;

c. modulating each of said carriers with a separate program, each of said programs being transmitted in a channel which has a frequency bandwidth equal to the frequency of said fundamental signal from which said carriers are derived;

d. combining said carriers to transmit a signal which is their vector sum, said signal having a periodic wave form with a frequency equal to the fundamental frequency of said harmonically related carriers; and e. adjusting the phase of a plurality of said carriers with respect to the zero phase reference of said fundamental frequency by an amount which substantially reduces the maximum peak-to-peak amplitude excursion of said vector sum transmitted signal.

2. The method as in claim 1 wherein the amplitudes of all of said carriers are maintained at substantially the same value before being combined for transmission.

3. The method of reducing distortion in a multicarrier communication system in which a plurality of said carriers is individually modulated and then combined to form a vector sum which is the transmitted signal, said method further comprising the steps of:

a. establishing a harmonically related coherent frequency relationship between the carriers of said system, said coherent harmonic frequency relationship being established by physically deriving each of said carriers from a fixed frequency fundamental signal to maintain the harmonic frequency relationship even with drift in the fundamental so that the sum and difference beat frequencies of any order which result from any beat combination of said video carriers in said combined transmitted signal will zero beat with one of the video carriers thereof;

b. maintaining the amplitudes of all of said carriers at substantially the same value before said carriers are combined for transmission;

c. modulating each of said carriers with a separate program, each of said programs being transmitted in a channel which has a frequency bandwidth equal to the frequency of said fundamental signal from which said carriers are derived;

d. combining said carriers to transmit said signal which is their vector sum, said signal having a periodic waveform with a frequency equal to the fundamental frequency of said harmonically related carriers;

e. adjusting the phase of each of said carriers with respect to the zero phase reference of said fundamental frequency by an amount which substantially minimizes the maximum peak-to-peak amplitude excursion of said vector sum transmitted signal; and f. providing parameters for said system wherein the carriers of said system are modulated to transmit a plurality of television program signals over a CATV cable and wherein the value of said fundamental frequency and the frequency of the periodic waveform of said transmitted signal is equal to 6 MHz and wherein said carriers are respectively the 9th, 10th, 11th, 13th, 14th, 25th and 29th through 35th harmonics of said fundamental frequency, and wherein the phase measured in radians of each of said carriers with resepect to the zero phase reference of said fundamental is as follows: 9th = 0; 10th = 0; 11th = −1.630; 13th = −1.709; 14th = − 1.402; 25th = − 1.492; 29th = 0; 30th = 0; 31st = −1.562; 32nd = −1.408; 33rd = +1.554; 34th = −1.418; and 35th = −1.884.

4. The method of reducing distortion in a multi-carrier communication system in which a plurality of said carriers is individually modulated and then combined to form a vector sum which is the transmitted signal, said method further comprising the steps of:

a. establishing a harmonically related coherent frequency relationship between the carriers of said system, said coherent harmonic frequency relationship being established by physically deriving each of said carriers from a fixed frequency fundamental signal to maintain the harmonic frequency relationship even with drift in the fundamental so that the sum and difference beat frequencies of any order which result from any beat combination of said video carriers in said combined transmitted signal will zero beat with one of the video carriers thereof;

b. maintaining the amplitudes of all of said carriers at substantially the same value before said carriers are combined for transmission;

c. modulating each of said carriers with a separate program, each of said programs being transmitted in a channel which has a frequency bandwidth equal to the frequency of said fundamental signal from which said carriers are derived;

d. combining said carriers to transmit said signal which is their vector sum, said signal having a periodic waveform with a frequency equal to the fundamental frequency of said harmonically related carriers;

e. adjusting the phase of each of said carriers with respect to the zero phase reference of said fundamental frequency by an amount which substantially minimizes the maximum peak-to-peak amplitude excursion of said vector sum transmitted signal; and f. providing parameters for said system wherein the carriers of said system are modulated to transmit a plurality of television program signal over a CATV cable and wherein the frequency of said fundamental and of said periodic wave form of said transmitted signal has a value equal to 6 MHz and wherein said carriers are the 9th, 10th, 11th, 13th, 14th, and 20th through 39th harmonics of said fundamental, and wherein the phases measured in radians of each of said carriers respectively with respect to the zero phase reference point of said fundamental is as follows; 9th = 0; 10th = 0; 11th = 0; 13th = 0; 14th = 0; 20th = −1.382; 21st = −1.451; 22nd = −1.520; 23rd = −1.444; 24th = −1.507; 25th = 0; 26th = −1.588; 27th = −1.526; 28th = −1.582; 29th = 0; 30th = +1.444; 31st = 0; 32nd = 0; 33rd = +1.597; 34th = 0; 35th = 0; 36th = +1.584; 37th = +3.014; 38th = +2.791; and 39th = +1.224.

5. The method of reducing distortion in a multi-carrier communication system in which a plurality of said carriers is individually modulated and then combined to form a vector sum which is the transmitted signal, said method further comprising the steps of:

a. establishing a harmonically related coherent frequency relationship between the carriers of said system, said coherent harmonic frequency relationship being established by physically deriving each of said carriers from a fixed frequency fundamental signal to maintain the harmonic frequency relationship even with drift in the fundamental so that the sum and difference beat frequencies of any order which result from any beat combination of said video carriers in said combined transmitted signal will zero beat with one of the video carriers thereof;

b. maintaining the amplitudes of all of said carriers at substantially the same value before said carriers are combined for transmission;

c. modulating each of said carriers with a separate program, each of said programs being transmitted in a channel which has a frequency bandwidth equal to the frequency of said fundamental signal from which said carriers are derived;

d. combining said carriers to transmit said signal which is their vector sum, said signal having a periodic waveform with a frequency equal to the fundamental frequency of said harmonically related carriers;

e. adjusting the phase of each of said carriers with respect to the zero phase reference of said fundamental frequency by an amount which substantially minimizes the maximum peak-to-peak amplitude excursion of said vector sum transmitted signal; and f. providing parameters for said system wherein the carriers of said system are modulated to transmit a plurality of television program signals over a CATV cable and wherein the value of said fundamental frequency and the frequency of the periodic waveform of said transmitted signal is equal to 6 MHz and wherein said carriers are the fundamental and the 2nd through the 20th harmonic thereof and wherein the phases measured in degrees and decimal parts of degrees for each of said carriers with respect to the zero phase reference of said fundamental is as follows: the 1st through 9th and 18th harmonics are zero phase; 10th = −72.02; 11th = −71.28; 12th = +86.41; 13th = +84.23; 14th = +90.71; 15th = −97.20; 16th = −92.13; 17th = +97.88; 19th = +72.04; and 20th = −86.45.

6. In a multi-carrier communication system, the improvement comprising;

a. means to estalish a harmonically related coherent frequency relationship between the carriers of said system;

b. means to signal modulate each of said carriers and to combine said carriers to transmit a signal which is their vector sum, said signal having a periodic wave form with a frequency equal to the fundamental frequency of said harmonically related carrier; and c. means to adjust the phase of each of said carriers with respect to the zero phase reference of said fundamental frequency by a predetermined amount in the range of 0° to 360°, the combined effect of all of said phase adjustments being to substantially minimize the peak-to-peak amplitude excursion of said combined vector sum transmitted signal from its maximum possible value.

7. In a multi-carrier CATV cable system, the improvement comprising:

a. means to establish a harmonically related coherent frequency relationship between the carriers of said system;

b. means to signal modulate each of said plurality of carriers to transmit a television program signal and means to combine said modulated carriers to transmit a signal which is their vector sum, said signal having a periodic wave form with a frequency equal to the fundamental frequency of said harmonically related carriers;

c. means to adjust the phase of each of said carriers with respect to the zero phase reference of said fundamental frequency by predetermined amounts which together substantially minimize the peak-to-peak amplitude excursion of said combined vector sum transmitted signal from its maximum possible value; and d. wherein the value of said fundamental frequency and the frequency of the periodic waveform of said transmitted signal is equal to 6 MHz and wherein said carriers are respectively the the 9th, 10th, 11th, 13th, 14th, 25th and 29th through 35th harmonics of said fundamental frequency, and wherein the phase measured in radians of each of said carriers with respect to the zero phase reference of said fundamental is as follows: 9th = 0; 10th = 0; 11th = −1.630; 13th = −1.709; 14th = −1.402; 25th = −1.492; 29th = 0; 30th = 0; 31st = −1.562; 32nd = −1.408; 33rd = +1.554; 34th = −1.418; and 35th = +1.884.

8. In a multi-carrier CATV cable system, the improvement comprising:

a. means to establish a harmonically related coherent frequency relationship between the carriers of said system, b. means to signal modulate each of said plurality of carriers to transmit a television program signal and means to combine said modulated carriers to transmit a signal which is their vector sum, said signal having a periodic wave form with a frequency equal to the fundamental frequency of said harmonically related carriers;

c. means to adjust the phase of each of said carries with respect to the zero phase reference of said fundamental frequency by predetermined amounts which together substantially minimize the peak-to-peak amplitude excursion of said combined vector sum transmitted signal from its maximum possible value; and d. wherein the frequency of said fundamental and of said periodic waveform of said transmitted signal has a value equal to 6 MHz and wherein said carriers are the 9th, 10th, 11th, 13th, 14th, and 20th through 39th harmonics of said fundamental, and wherein the phases measured in radians of each of said carriers respectively with respect to the zero phase reference point of said fundamental is as follows: 9th = 0; 10th = 0; 11th = 0; 13th = 0; 14th = 0; 20th = −1.382; 21st = −1.451; 22nd = −1.520; 23rd = −1.444; 24th = −1.507; 25th = 0; 26th = −1.588; 27th = −1.526; 28th = −1.582; 29th = 0; 30th = +1.444; 31st = 0: 32nd = 0; 33rd = +1.597; 34th = 0; 35th = 0; 36th = +1.584; 37th = +3.014; 38th = +2.791; and 39th = +1.224.

9. In a multi-carrier CATV cable system, the improvement comprising:

a. means to establish a harmonically related coherent frequency relationship between the carriers of said system:

b. means to signal modulate each of said plurality of carriers to transmit a television program signal and means to combine said modulated carriers to transmit a signal which is their vector sum, said signal having a periodic wave form with a frequency equal to the fundamental frequency of said harmonically related carriers;

c. means to adjust the phase of each of said carriers with respect to the zero phase reference of said fundamental frequency by predetermined amounts which together substantially minimize the peak-to-peak amplitude excursion of said combined vector sum transmitted signal from its maximum possible value; and d. wherein the value of said fundamental frequency and the frequency of the periodic waveform of said transmitted signal is equal to 6 MHz and wherein said carriers are the fundamental and the 2nd through the 20th harmonic thereof and wherein the phases measured in degrees and decimal parts of degrees for each of said carriers with respect to the zero phase reference of said fundamental is as follows: the 1st through 9th and the 18th harmonics are each zero phase; 10th = −72.02; 11th = −71.28; 12th = +86.41; 13th = +84.23; 14th = +90.71; 15th = −97.20; 16th = −92.13; 17th = +97.88; 19th = +72.04; and 20th = −86.45.

10. Headend equipment for a system for cable distribution of a plurality of multiplexed television programs on a plurality of channels as a single cable signal, said cable signal being the vector sum of the respective individual carriers of each of said programs, said equipment comprising:

a. a source of system frequency synchronizing signal maintained at a fixed fundamental frequency equal to said program bandwith;
b. program signal source means to provide a separate program modulated video carrier for each of said channels;
c. means to establish a harmonically related coherent frequency relationship between said carriers and said source of synchronizing signal such that the video carrier for each of said channels has a frequency which may be any integral multiple of the frequency of said first synchronizing signal fundamental frequency, said fundamental frequency synchronizing signal thus simultaneously controlling the frequency relationships of said video carriers for said plurality of channels and setting the minimum frequency separation between the video carriers of adjacent pairs of channels at an integral multiple of the frequency of said first synchronizing signal, each of said coherent harmonic video carriers being physically derived from said fundamental frequency synchronizing signal itself to maintain the harmonic frequency relationship even with drift in the fundamental so that the sum and difference beat frequency of any order which result from any beat combination of said video carriers and which fall within one of said channels will always zero beat with the video carriers thereof;
d. means to combine said carriers for transmission as a single cable signal; and
e. means to control the phase relationship of each of said harmonically related coherent carriers with respect to the zero phase reference of their fundamental to reduce the peak value of their vector sum in said cable signal from its maximum possible value which occurs if all of said carriers reach their peak simultaneously to thereby reduce distortion during transmission of said cable signal through said cable.

11. Apparatus as in claim 10 wherein said system frequency synchronizer comprises a source of signal having a fixed fundamental frequency and a harmonic generator receiving said signal and having an output comprising a plurality of harmonics of said synchronizing signal.

12. Apparatus as in claim 11 wherein:

a. said program signal source comprises a modulator and means to apply a locally generated program as an input to said modulator; and
b. said frequency relationship establishing means comprises means to select one of the harmonics from the output of said system frequency synchronizer as a carrier to be modulated in said modulator.

13. Apparatus as in claim 11 wherein:

a. said program signal source comprises a modulator and means to apply as an input to said modulator the output of a demodulator which is connected to demodulate a received broadcast television signal; and
b. said frequency relationship establishing means comprises means to select one of the harmonics from the output of said system frequency synchronizer to apply as a carrier input to be modulated in said modulator.

14. Apparatus as in claim 11 wherein:

a. said program signal source comprises a modulator and means to apply a demodulated received broadcast television signal as a modulating input thereto; and
b. said frequency relationship establishing means comprises a phaselock circuit slaving the output of said modulator to a coherent frequency relationship with a selected one of the harmonics of the output of said system frequency synchronizer.

15. Apparatus as in claim 11 wherein:

a. said program signal source comprises a heterodyne intermediate frequency signal processing circuit including a down converter for converting a received television broadcast signal to a predetermined intermediate frequency; and
b. said frequency relationship establishing means comprises an upconverter for converting said intermediate frequency to a desired carrier frequency and a phaselock circuit slaving the output of said upconverter to a selected one of the harmonics of the output of said system frequency synchronizer of forcing the local oscillator signal or said upconverter to drift in offsetting synchromous relationship with the drift output of said downconverter.

16. Headend equipment for a system for distribution of a plurality of multiplexed television programs on a plurality of channels each of bandwidth $f_s$ as a single cable signal, said equipment comprising:

a. a system frequency synchronizer comprising a source or signal having a fixed fundamental frequency, $f_s$, and harmonic generator means receiving said signal and having an output comprising a plurality of harmonics or said synchronizing signal and a bus conductor to supply the output of said harmonic generator to each of said channels;
b. a program signal source for each channel, said source having as its output a program modulated intermediate frequency carrier of frequency $f_i$;
c. a signal frequency translating circuit for each channel;
d. first input means to supply to the signal frequency translating circuit of each channel the output frequency $f_i$ of the program signal source in that channel, and second input means comprising a first tuned amplifier connected to said bus conductor and tuned to a frequency of $f_i + (n+m) f_s$ to supply to said frequency translating circuit a signal derived from a selected one of said harmonics and having a frequency $f_i + (n+m) f_s$ were $(n+m)$ is an unrestrictedly selected integer which is different for each of said channels to produce as the output of said frequency translating circuit the program modulated video carrier for that channel at a frequency $(n+m) f_s$, each of said video carriers thus being a coherent harmonic of the synchronizing signal of frequency $f_s$;
e. means to combine said outputs of said frequency translating circuits to form said single cable signal; and
f. means to control the phase relationship of each of said harmonically related coherent carriers with respect to the zero phase reference of the fundamental which is said synchronizing signal to reduce the peak value of their vector sum in said single cable signal from its maximum possible value which occurs if all of said carriers reach their peak simultaneously to thereby reduce distortion during transmission through said cable, said control means comprising a second tuned amplifier connected to said conductor bus in each of said channels, said second amplifier being tuned to a frequency of $(n + m) f_s$, and adjustable phase shifter means connected between said combiner means and the output of said signal translating circuit of each of said channels, and means to measure the phase relationship between the output of said phase shifter and the output of said second tuned amplifier respectively in each of said channels.

17. Headend equipment for a system for distribution of a plurality of multiplexed television programs on a plurality of channels each of bandwidth $f_s$ as a single cable signal, said equipment comprising:

a. a system frequency synchronizer comprising a source of signal having a fixed fundamental frequency, $f_s$, and harmonic generator means receiving said signal and having an output comprising a plurality of harmonics of said synchronizing signal and a bus conductor to supply the output of said harmonic generator to each of said channels;

b. a program signal source for each channel, said source having as its output a program modulated intermediate frequency carrier of frequency $f_i$;

c. a signal frequency translating circuit for each channel;

d. first input means to supply to the signal frequency translating circuit of each channel the output at frequency $f_i$ of the program signal source in that channel; and second input means comprising an amplifier connected to said bus conductor and tuned to derive a signal of frequency $(n + m) f_s$ from said bus equal to the carrier frequency for that channel, a voltage controlled local oscillator of signal frequency $f_i + (n + m) f_s$, and mixer means connected to mix the output of said oscillator and said amplifier in a loop to phaselock said voltage control local oscillator in each of said channels to said output of said program signal source, and means to supply the output of said oscillator as said second input to said frequency translating circuit to produce as the output of said frequency translating circuit the program modulated video carrier for that channel at a frequency $(n + m) f_s$ which is coherent with said amplifier output, each of said video carriers thus being a coherent harmonic of the synchronizing signal of frequency $f_s$;

e. means to combine the outputs of said frequency translating circuit to form said single cable signal; and f. means to control the phase relationship of each of said harmonically related coherent carriers with respect to the zero phase reference of the fundamental which is said synchronizing signal to reduce the peak value of the vector sum in single cable signal from its maximum possible value which occurs if all the said carriers reach their peak simultaneously to thereby reduce distortion during transmission through said cable, said control means comprising an adjustable phase shifter means connected between said combiner means and the output of said signal frequency translating circuit in each of said channels, and means to measure the phase relationship between the output of said phase shifter and the output of said tuned amplifier.

18. Headend equipment for a system for transmission of a plurality of television programs on a plurality of channels in a single cable, each channel having the same predetermined frequency bandwidth, said equipment comprising:

a. a source of synchronizing signal having a predetermined fundamental fixed frequency equal to said frequency bandwidth of a channel;

b. means to derive from said synchronizing signal a plurality of video carrier signals having frequencies which are coherent harmonics of any order without restriction of the frequency of said synchronizing signal fundamental frequency, at least one of said carrier signals being an even order harmonic of said synchronizing signal; and c. means utilizing a different one of said plurality of carrier signals to transmit a television program signal over each one of said plurality of channels, said fundamental frequency synchronizing signal thus simultaneously controlling the frequency relationships of said video carriers for said plurality of channels and setting the minimum frequency separation between the video carriers of adjacent pairs of channels at an integral multiple of the frequency of said first synchronizing signal so that sum and difference beat frequencies of any order which result from any beat combination of said video carriers and which fall within one of said channels will zero beat with the video carrier thereof.

19. Equipment as in claim 18 wherein said source of synchronizing signal has a fixed frequency of 6 MHz.

20. Headend equipment for a system for transmission of television programs on a plurality of channels in a single cable, each channel having the same predetermined frequency bandwidth, said equipment comprising:

a. a system frequency synchronizer comprising a source of signal having a fixed fundamental frequency, $f_s$, equal to said frequency bandwidth of a channel, and harmonic generator means receiving said signal and having an output comprising a plurality of harmonics of said synchronizing signal;

b. a program signal source for each channel, said source having as its output a program modulated intermediate frequency carrier of frequency $f_i$, the frequency $f_i$ being an integral multiple of the frequency $f_s$;

c. a signal frequency translating circuit for each channel;

d. first input means to supply to the signal frequency translating circuit of each channel the output at frequency $f_i$ of the program signal source in the channel, and second input means to supply to said frequency translating circuit a selected one of said harmonics at a frequency $f_i + nf_s$, where $n$ is a preselected integer, to produce as the output of said frequency translating circuit the program modulated video carrier for that channel at a frequency $nf_s$, each of said video carries thus being a coherent harmonic of the synchronizing signal of frequency $f_s$, and at least one of said carries being an even order harmonic thereof; and e. said intermediate frequency, $f_i$, being smaller in numerical value that the largest of said video carrier frequencies, $nf_s$, and each of said carriers being harmonics of any order, $n$, even or odd without restriction, of the frequency $f_s$, said fundamental frequency synchronizing signal, $f_s$, thus simultaneously controlling the frequency relationships of said video carriers for said plurality of channels and setting the minimum frequency separation between the video carriers of adjacent pairs of channels at an integral multiple of the frequency of said synchronizing signal, $f_s$, so that the sum and difference beat frequencies of any order which result from any beat combination of said video carriers, and which fall within one of said channels will zero beat with the video carrier thereof.

21. Equipment as in claim 20 wherein said synchronizing signal has a frequency $f_s = 6$ MHz and said intermediate frequency signal has a frequency $f_i = 48$ MHz.

22. Equipment as in claim 20 wherein each of said signal translating circuits comprises a heterodyne mixer and each of said second input means to supply the signal of frequency $f_i + nf_s$ to said mixer comprises a tuned amplifier connected to the output of said system frequency synchronizer and tuned to the frequency $f_i + nf_s$.

23. Equipment as in claim 21 and further including circuit means to phaselock said intermediate frequency carrier to one of said plurality of harmonics of said synchronizing signal having the same frequency, $f_i$, as said carrier.

24. Equipment as in claim 21 wherein said program signal source comprises the output stage of the down converter of a heterodyne processor for a television program which has been broadcast and received.

25. Equipment as in claim 24 wherein the local oscillator of said down converter is phaselocked to a signal of frequency $f_i$ which is derived from the output of said system frequency synchronizer by an amplifier tuned to said frequency $f_i$.

26. Equipment as in claim 21 wherein said program signal source comprises a modulator circuit for modulating a carrier with a locally produced television program.

27. Equipment as in claim 26 wherein the carrier input to said modulator is a signal of frequency $f_i$ which is derived from the output of said system frequency synchronizer by an amplifier tuned to said frequency $f_i$.

28. The method of reducing the visual effect of triple beat and other second and third order distortion in the transmitted multiplexed signal in a multi-carrier cable television system having the same channel frequency bandwidth for each channel, said method comprising the steps of:

a. providing a synchronizing signal having a fixed fundamental frequency equal to the frequency of said channel bandwidth frequency;

b. establishing a harmonically related coherent frequency relationship between the carriers of said system by physically deriving each of said carriers from said synchronizing signal to maintain the harmonic frequency relationship between carriers even with drift in the fundamental so that sum and difference beat frequencies of any order which result from any beat combination of said video carriers in said mutliplexed transmitted signal will zero beat with one of the video carriers thereof;

c. deriving each of said carriers as a different harmonic of said synchronizing signal at a frequency selected without restriction as to whether said harmonic frequency is of odd or even order to thereby provide a system including at least one odd order harmonic and one even order harmonic of said fundamental frequency synchronizing signal;

d. modulating a plurality of said carriers with a separate program, each of said programs thus being transmitted in a channel which has a frequency bandwidth equal to the frequency of said fundamental signal from said carriers are derived; and e. combining said modulated carriers to transmit a signal which is their vector sum.

29. A method as in claim 28 wherein said fixed fundamental frequency synchronizing signal is provided at a frequency of 6 MHz.

* * * * *

Disclaimer 3,898,566.—*Israel Switzer,* North York, Ontario, Canada; *Arie Zimmerman,* Santa Monica; *Lucius T. La Fleur,* Torrance and *Patrick A. Segrave,* Santa Monica, Calif. METHOD AND APPARATUS FOR REDUCING DISTORTION IN MULTICARRIER COMMUNICATION SYSTEMS. Patent dated July 29, 1975. Disclaimer filed May 9, 1983, by the assignee, *Phasecom Corp.*

Hereby enters this disclaimer to claims 1 through 17 and 20 through 27 of said patent.

[*Official Gazette July 5, 1983.*]